Dec. 28, 1965  A. H. WILLINGER ETAL  3,225,736
AQUARIUM ASSEMBLY

Original Filed Aug. 10, 1959

INVENTORS.
ALLAN H. WILLINGER
HARDING W. WILLINGER

BY Friedman & Goodman

ATTORNEY

Dec. 28, 1965     A. H. WILLINGER ETAL     3,225,736
AQUARIUM ASSEMBLY
Original Filed Aug. 10, 1959     2 Sheets-Sheet 2
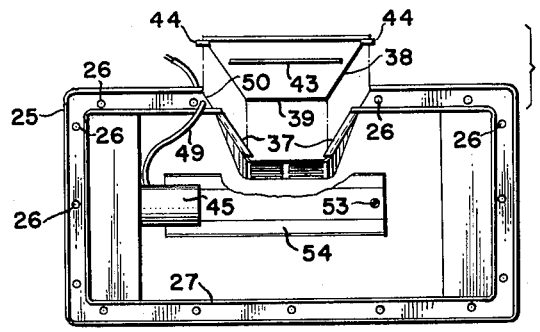
FIG.5.
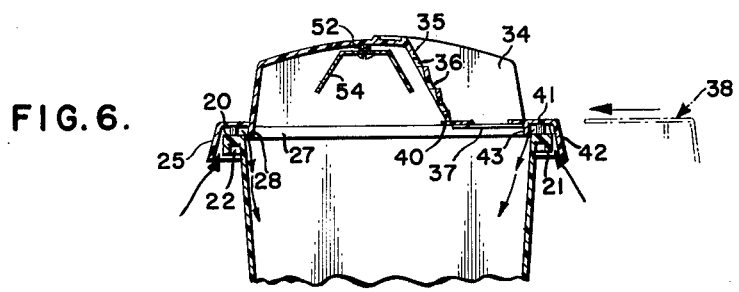
FIG.6.
FIG.7.
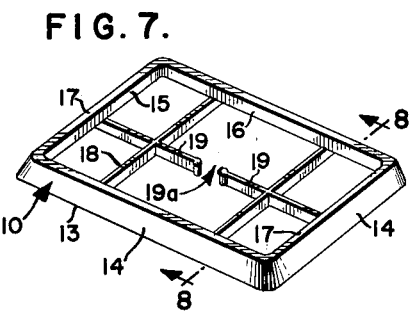
FIG.8.
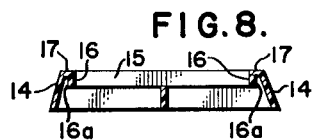
INVENTORS.
ALLAN H. WILLINGER
HARDING W. WILLINGER
BY Friedman & Goodman
ATTORNEY

United States Patent Office 3,225,736
Patented Dec. 28, 1965

3,225,736
AQUARIUM ASSEMBLY
Allan H. Willinger and Harding W. Willinger, New Rochelle, N.Y., assignors to Aquariums Incorporated, Maywood, N.J., a corporation of Delaware
Original application Aug. 10, 1959, Ser. No. 832,747, now Patent No. 3,091,220, dated May 28, 1963. Divided and this application Jan. 11, 1963, Ser. No. 256,794
2 Claims. (Cl. 119—5)

This is a division of our application Serial No. 832,747, filed August 10, 1959, now Patent No. 3,091,220.

This invention relates to an aquarium assembly.

It is an object of this invention to provide an aquarium for containing and exhibiting tropical fish, and more particularly to provide an aquarium formed of a thermoplastic material which is capable of efficiently holding and attractively displaying the contents thereof and to resist the deleterious effects and pressures involved when used with a substantial quantity of water in conjunction with the usual aquarium contents such as gravel and accessory aquarium equipment.

It is also an object of this invention to provide an aquarium arrangement which is assembled from a number of units formed of a molded synthetic resin and which provides an attractive appearance without the use of excessive material and in an improved manner.

It is an additional object of this invention to provide an aquarium arrangement of the character indicated wherein means are provided for supporting the tank unit in an efficient manner which, among other features, provides for the reinforcement of the tank unit as well as protection to the underlying support upon which the aquarium may be placed.

This invention has for its object the provision of an aquarium arrangement of the character indicated wherein the tank unit is formed of a thermoplastic material in such manner as to be capable withstanding the temperatures and pressures involved without undesired bulging or deformation of the configuration thereof.

It is a further object of this invention to provide an aquarium arrangement of the character indicated with a cover unit which may be readily disposed upon or removed from the tank unit without dripping and in an efficient and convenient manner and which serves to conserve water and give access to the interior of the aquarium tank when desired, said cover also serving as a support for an illuminating means whereby the aquarium contents may be attractively displayed without adversely affecting the parts of the assembly or the contents thereof.

It is also among the objects of this invention to provide an aquarium tank unit with a cover arrangement formed of a thermoplastic material having an illuminating means disposed therein which is capable of functioning efficiently in spite of heating or evaporating effects due to the heat generated by the illuminating means or other factors and which also provides for effective ventilation of the aquarium tank.

Other and further objects of this invention will become apparent from the description thereof contained in the annexed drawings, specifications and claims or will otherwise become obvious. It will be understood that the invention herein disclosed may be employed for other purposes to which the structure and arrangement are adapted.

In the accompanying drawings:

FIGURE 5 is a bottom view, on an enlarged scale of the cover employed in the said form of the invention;

FIGURE 6 is a fragmentary cross-sectional view taken about the line 6—6 of FIGURE 4 and also depicting a displaced position of the horizontal panel employed in the aforesaid cover in broken lines;

FIGURE 7 is a perspective view of the base employed in the said form of the invention; and FIGURE 8 is a cross-sectional view taken about the line 8—8 of FIGURE 7.

Figure 1:
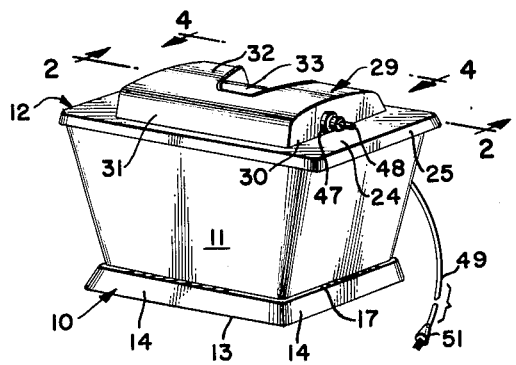
FIGURE 1 is a perspective view of a form of the present invention.

The accompanying drawings illustrate a preferred embodiment of the aquarium assembly comprising the present invention. Said assembly comprises a tank portion designated generally by the numeral 11 which is removably mounted upon the base designated generally by the numeral 10 and surmounted by a cover member designated generally by the numeral 12.

The base member 10 of the instant aquarium assembly comprises a framed hollow grid which is defined by a rectangular frame 13. Said frame 13 is in the general form of an inverted U-shaped channel member having an exterior generally vertically disposed face 14 and similarly disposed interior faces 15 and 16. The interior and exterior faces are connected by means of the horizontal face portion 17. Upright cross-members 18 and 19 extend from the bottom of the frame to the bottom of said interior inclined and vertical faces 15 and 16 and also to the internal surfaces 14a, 15a and 16a of said inclined, vertical and horizontal faces, the said upright cross-members being formed integrally with the said inclined, vertical and horizontal faces. These cross-members comprise a supporting and reinforcing grid work for the tank and base frame as will more clearly appear.

Figure 2:
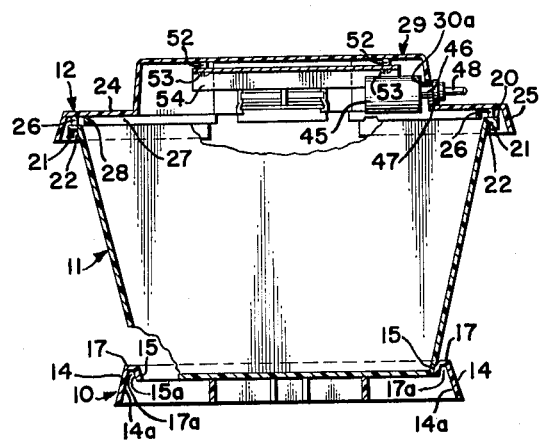
FIGURE 2 is a cross-sectioned view, on an enlarged scale, taken about the line 2—2 of FIGURE 1, with parts broken away for purposes of illustration.

As may be seen in FIGURES 2 and 7, upright cross-member 19 is discontinuous at its center portion, thereby providing aperture 19a which may function to engage a suitable projection on any surface supporting said base. In this manner, accidental displacement of the base may be minimized. Moreover, such discontinuity also permits a certain amount of expandability of the base, as is hereinafter described. The entire base 10 is advantageously formed as one piece composed of any substantially rigid material, such as a molded plastic and is preferably opaque.

The lower portion of the tank 11 is removably received within the rectangular frame of the base 10 as defined by the vertically disposed interior faces 15 and 16 thereof and rests upon the upper edges of the grid work comprising the cross-members 18 and 19.

It will be noted that by reason of the foregoing arrangement, the tank, when the aquarium is assembled, rests within the confines of the base frame, a certain degree of locking engagement occurs between the base and tank. This locking action is due to the slight bulging or dilation of the walls of the lower portion of the tank when filled with water which causes the exterior wall portions of the tank to bear against and frictionally engage the interior base frame walls. The tank and base may be readily assembled by placing one without the other. However, when filled with water, the locking action referred to above permits the entire assembly to be readily moved as a unit by grasping the tank portion only. The frictional engagement between the aforesaid walls prevents accidental separation while permitting ready disengagement of the aquarium elements when desired. In this connection, it will be noted that the discontinuity of the upright cross-member 19 facilitates the seating of the tank in the base since such discontinuity allows for expansion of the shorter end portions 13a of the frame 13, when said end portions are subjected to pressure by the tank. Similarly, said end portions 13a are expandable so as to receive and securely hold tanks whose dimensions present slight variations in size and shape.

The tank portion 11 of the aquarium assembly has the approximate conformation of an inverted, truncated, rectangular pyramid. Said tank is advantageously formed of a molded plastic material and is of course transparent to permit the contents of the tank to be viewed. The walls of the tank are subjected to considerable pressure when filled with water and the resulting outward curvature which is more pronounced in the upper or mouth region of the tank would of course materially affect the light transmission characteristics of the walls of the tank and may result in optical distortion to a viewer of the contents. Since the most significant function of an aquarium is to exhibit the contents in most advantageous form, this of course would almost completely destroy the utility of a tank of this character. In order to prevent such outward curvature or bulging action and the resultant distortion, as well as to eliminate the possibility of the fracture of the plastic material of the tank walls under the pressure of the water, the tank walls could of course be increased in thickness. However, such increase in thickness would result in an excessive cost and weight for the tank and would in many instances undesirably affect the optical characteristics of the tank walls. In order to overcome this difficulty, the walls of the tank are initially formed or molded with an inwardly directed curvature. This concavity is more pronounced in the region of the top of the tank. Thus, under the pressure of the water, the tank walls are forced outwardly and assume planar positions so as to provide for maximum aesthetic appeal and optical efficiency and safely retain the tank contents without excessive wall thickness. In order to provide for further reinforcement of the upper wall portions and to prevent distortion or bulging of the tank walls by the lateral pressure of the water, the mouth or rim of the tank is also provided with a rectangular flange 20 having a depending vertical lip 21, the said lip defining a continuous perimetric groove 22 between the lip and the adjacent external surfaces of the walls of the tank. The rectangular flange 20 thus provides an additional stiffening and reinforcing means for the tank which makes possible the use of relatively thin tank walls while maintaining the walls in planar disposition during use. This flange also forms a convenient hand grip to permit the tank to be lifted readily and without danger of slippage even when filled with water. The flange 20 has a further function in connection with the cover member which will hereinafter be pointed out. It should be noted that the lower portion of the tank is supported against undesired outward expansion or bulging by contact with the interior faces 15 of the base, as heretofore indicated.

The cover portion 12 of the aquarium assembly is removably disposed upon the top or open mouth of the aquarium. Said cover comprises a housing 29 from the lower edge of which an integrally formed substantially horizontally disposed marginal portion 24 extends. The peripheral edge of said marginal portion is formed with a downwardly directed peripheral channel designated generally by the numeral 23 within which the rim of the tank mouth is received, as will be more particularly hereinafter described. The cover is advantageously formed of a synthetic resin or thermoplastic material and molded as an integral unit.

Figure 4:
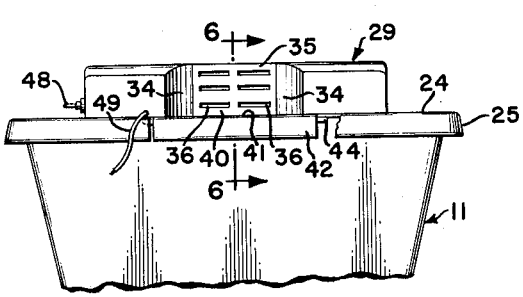
FIGURE 4 is a fragmentary elevational view, on an enlarged scale, as seen from line 4—4 of FIGURE 1.

The housing portion 29 of the cover 12 is formed with substantially vertical side walls 30 and 31 and an arcuate top wall portion 32. The rearwardly directed portion of the housing is provided with a medially disposed recessed portion 33 defined by converging side walls 34 which are connected by an inclined louvered wall portion 35. Said louvered wall portion 35 is formed with a plurality of slots 36 providing communication between the external atmosphere and the interior of the cover overlying the mouth of the aquarium tank. A horizontal flange 37 extends along the base of each of the converging side walls 34. These flanges support a removable panel 38 having an inner end 39 disposed in contact with the bottom 40 of louver 35 when the panel is disposed on the cover, as may be seen from FIGURES 4, 5 and 6.

The said panel 38 has an upper surface 41 and vertical flange 42 aligned with the upper surface and vertical flange 25 of the cover. The interior surface of the panel is also integral with a vertical wall 43 aligned with the wall 27 of the cover, thus forming a continuum of depending peripheral channel 23 of the cover. Suitable tabs 44 are provided at the ends of the said vertical flange 42, these tabs being engageable with the adjoining inner surface of vertical flange 25. When it is desired to remove the panel 38, it is only necessary to exert a slight spreading pressure on those portions of vertical flange 25 adjoining the vertical flange 42 of the panel. In this way, said adjoining portions of vertical flange 25 will be separated sufficiently to allow the tabs to clear the ends of said portions, in which position the panel may be removed to the position depicted in FIGURE 5. Re-insertion of the panel in the direction indicated by the arrow in FIGURE 6, may also be accomplished by a similar spreading action followed by sliding of the panel upon the flanges 37 into contact with the bottom of the louver, the said tabs then being disposed interiorly of vertical flange 25. In this position, the spreading pressure may be released with consequent securing of the panel against outward displacement from the cover.

Removable panel 38 provides a convenient means of access to the aquarium tank for the introduction of various materials into the tank as required. Thus, food for tropical fish may be introduced and fish, shells, sand, gravel and plants may be readily introduced or removed as desired without disturbing the entire cover. The removal of the panel also provides a convenient opening at the top of the tank adjacent a wall whereon such aquarium accessories as heaters, filters or aerators may be permanently mounted while maintaining the aquarium in substantially covered condition.

Figure 3:
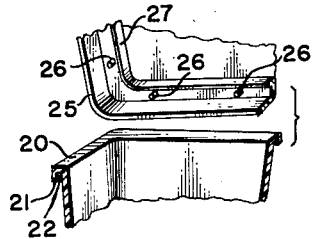
FIGURE 3 is a fragmentary view depicting in perspective a corner portion of the tank employed in the aforesaid form of the invention and a corresponding portion of the cover used in conjunction with said tank, the said cover being shown in an upright position with respect to the tank, as when lifted away therefrom.

As heretofore indicated, the peripheral edge of the marginal portion of the cover is formed with a depending or downwardly directed channel 23. Said channel is defined by depending peripheral flange 25 and depending wall 27 which extends from the lower surface of the cover and is disposed in spaced relation to flange 25. Wall 27 of the channel is somewhat shorter than flange 25. A plurality of depending bosses 26 are disposed within the channel as thus defined. Said studs are disposed in spaced relation to said flange along the length of said channel. These studs are shorter than wall 27 of the channel and are disposed so that when the cover is positioned on the aquarium tank the ends of the studs rest upon the upper surface of rectangular flange 20 thereof. The spacing of the channel walls is greater than the transverse dimension of the rectangular flange 20 so that when said studs rest thereon the cover is maintained in spaced relation to the tank and air may freely circulate from the atmosphere into the interior of the space defined by the tank and cover. This arrangement prevents the settling of dust upon the water in the tank while providing a healthy and stabilized atmosphere for the aquarium and to prevent overheating of the tank by the illuminating means, as will more clearly appear hereafter. In operation, a certain amount of moisture will condense or collect upon the interior surfaces of the tank cover. This may be the result of evaporation or splattering of water due to the aeration or filtration equipment in the tank. The droplets of water which thus form on the interior surface of the cover would normally drip and cause damage or mar furniture surfaces when the cover is removed. The instant arrangement greatly reduces the possibility of such dripping action. When it is desired to remove the cover, it may be readily pivoted upon the studs resting on the rectangular flange of the tank. As the tank cover is thus inclined, the droplets of water on the interior surface thereof flow along said surface until they are arrested by the interior surface 28 of wall 27 where they drop back into the tank. The cover may then be completely removed, as shown in FIGURE 3, with a minimum amount of spillage or loss of water. When the cover is in place, droplets of water are guided toward the marginal edges of the cover by reason of the curvature of the top wall of the housing. The water droplets thus tend to flow along the interior surfaces of the cover, finally dripping back into the tank along the interior surface 28 of wall 27. This prevents the escape of water from the tank, reduces the number of droplets collecting on the interior surface of the cover and helps to conserve water in the tank.

The housing 29 is also provided with an electric light socket 45 having a threaded tube 46 projecting through an aperture 30a in said housing and secured therein by a knurled nut 47, the said tube 46 receiving a suitable switching means 48 operable through said tube to open and close an electric circuit in conjunction with said socket and any light bulb received therein. An electric current may be supplied to said socket, as by a conventional electric cable 49 which extends from said socket and through a cutout 50 in a portion of the upper surface of the cover adjacent to the above-described removable panel, the said cable thence being extendable to a conventional electric plug 51 which may be inserted in an electric wall socket in the usual manner. The interior surface of housing 29 is also provided with a pair of bosses 52 which are threadedly engaged with screws 53 securing a metallic reflector 54 above the said electric light socket and in a position wherein the light of any bulb received in said socket will be directed towards the contents of the tank. The reflector being spaced from the interior surface of the housing permits the air to circulate therebetween. The reflector also serves to reflect a considerable portion of the heat generated by the lamp so that distortion of the thermoplastic material from which the cover is formed is prevented.

It has heretofore been pointed out that the cover is mounted upon the tank in such manner as to provide an air space around the periphery of the tank rim through which air from the external atmosphere may enter or leave the aquarium area. It has also been pointed out that the housing is provided with a louver wall, which again permits circulation of air from the interior to the external atmosphere. When the illuminating means are used, the air confined between the cover and the interior of the tank is naturally heated and tends to rise, passing out to the external atmosphere through the louver slots in the housing. This causes fresh air to be drawn into said space from the external atmosphere through the air space around the peripheral rim of the tank as above described. Thus, fresh air is continually drawn into the space above the aquarium water and caused to be expelled therefrom through the louver slots by reason of the heat generated by the lamp. Thus, the heat from the lamp causes a continuous circulation of fresh air over the surface of the aquarium water, ventilating it and preventing the temperature from rising to a point where it may have any deleterious effect upon the aquarium contents, or the material from which the aquarium assembly is formed. The ventilating action thus produced causes the temperature in the enclosed region of the aquarium assembly to be stabilized and to be maintained at a constant level. The heat generated by the lamp in effect creates a constant draft over the aquarium water, carrying away any undesirable gasses or odors which may be generated therein and assisting in maintaining the aquarium water in a fresh and aerated condition.

While we have here shown and described a preferred embodiment of our invention, it will be apparent however that this invention is not limited to this embodiment and that many changes, additions and modifications can be made in connection therewith without departing from the spirit and scope of the invention as herein disclosed and hereinafter claimed. Having described our invention what we claim as new and desire to secure by Letters Patent is:

1. A cover member for an aquarium tank, said cover member comprising a planar wall having a raised housing provided with opposing end portions and opposing side portions, one of said side portions having opposing side walls which are connected by a wall portion to define a recessed portion in said housing, said housing being open between said side walls, and a removable panel mounted by said housing to close said opening, said planar wall having an upper surface and a peripheral depending flange, said panel having an upper surface disposed within the plane of the upper surface of said planar wall, and said panel having a peripheral depending flange aligned with the peripheral flange of said planar wall, said panel being provided with lateral projections at the ends of its depending flange, said projections being engageable with the adjacent inner surface portions of the depending planar wall flange.

2. A cover member for an aquarium tank, said cover member comprising a planar wall having a raised housing provided with opposing end portions and opposing side portions, one of said side portions having opposing side walls which are connected by a wall portion to define a recessed portion in said housing, said housing being open between said side walls, and a removable panel mounted by said housing to close said opening, said planar wall having an upper surface and a peripheral depending flange, said panel having an upper surface disposed within the plane of the upper surface of said planar wall, and said panel having a peripheral depending flange aligned with the peripheral flange of said planar wall, said panel being provided with lateral projections at the ends of its depending flange, said projections being engageable with the adjacent inner surface portions of the depending planar wall flange, said planar wall being formed of flexible material to provide for the engagement and disengagement of said projections with said planar wall flange.

References Cited by the Examiner

UNITED STATES PATENTS

| | | | |
|---|---|---|---|
| 1,322,322 | 11/1919 | Mack | 119—5 |
| 2,274,819 | 3/1942 | Becker | 220—24 |
| 2,467,525 | 4/1949 | Fricke | 119—18 |
| 2,503,945 | 4/1950 | Grossniklaus | 119—5 |
| 2,776,642 | 1/1957 | Sepersky | 119—5 |
| 2,873,782 | 2/1959 | Gunn | 150—.5 XR |
| 3,018,758 | 1/1962 | Arnould | 119—5 |

SAMUEL KOREN, *Primary Examiner.*

HUGH R. CHAMBLEE, *Examiner.*